(12) United States Patent
Taniguchi et al.

(10) Patent No.: US 7,384,996 B2
(45) Date of Patent: Jun. 10, 2008

(54) PHOSPHORUS-CONTAINING POLYMER COMPOUND, SYNTHESIZING METHOD THEREOF, ANTIOXIDANT, HIGH-DURABILITY POLYMER ELECTROLYTE COMPOSITE, ELECTRODE, AND FUEL CELL

(75) Inventors: Takumi Taniguchi, Tokyo (JP);
Masayoshi Takami, Hamamatsu (JP);
Masahiro Rikukawa, Yokohama (JP);
Yuko Takeoka, Tokyo-to (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 401 days.

(21) Appl. No.: 10/720,469

(22) Filed: Nov. 25, 2003

(65) Prior Publication Data

US 2004/0138352 A1   Jul. 15, 2004

(30) Foreign Application Priority Data

Nov. 28, 2002   (JP) .............................. 2002-346180

(51) Int. Cl.
*C08K 5/5317* (2006.01)
(52) U.S. Cl. .................... 524/123; 429/30; 429/41; 429/42; 429/314; 502/101; 525/188; 524/130
(58) Field of Classification Search ............... 524/123; 429/41–42, 30, 314; 502/101; 525/188
See application file for complete search history.

(56) References Cited

U.S. PATENT DOCUMENTS 6,607,856 B2 * 8/2003 Suzuki et al. ................. 429/30

6,933,068 B2 * 8/2005 Asano et al. ................. 429/33

FOREIGN PATENT DOCUMENTS

| DE | 102 01 886 A1 | 8/2002 |
|---|---|---|
| JP | H-07-504456 | 5/1995 |
| JP | 2000-011755 | 1/2000 |
| JP | 2000-011756 | 1/2000 |
| JP | 3061197 | 4/2000 |
| JP | 2001-253921 | 9/2001 |
| JP | 2002-212291 | 7/2002 |
| WO | PCT WO 93/18077 | 9/1993 |
| WO | WO 93/18076 | 9/1993 |
| WO | WO95/08581 | 3/1995 |

OTHER PUBLICATIONS

Synthesis and evaluation of phosphonated poly(4-phenoxybenzoyl-1,4-phenylene), S. Yanagimachi et al., Synthetic Metals 135-136 (2003) 69-70.*
German Official Action dated Feb. 2, 2005.
Yanagimachi, S., et al., Examination on synthesis of phosphonated poly (4-phenoxybenzoyl-1, 4-phenylene), *Polymer Reprints*, Japan, vol. 51, No. 4.

* cited by examiner

*Primary Examiner*—Peter Szekely
(74) *Attorney, Agent, or Firm*—Finnegan, Henderson, Farabow, Garrett & Dunner, LLP (57) ABSTRACT

The invention provides phosphonated poly(4-phenoxybenzoyl-1,4-phenylene), and synthesizing method thereof, an antioxidant formed of phosphonated poly(4-phenoxybenzoyl-1,4-phenylene), a high-durability polymer electrolyte composite formed of a fluoropolymer electrolyte and phosphonated poly(4-phenoxybenzoyl-1,4-phenylene), and a fuel cell in which the high-durability polymer electrolyte composite is used in an electrode thereof.

7 Claims, 4 Drawing Sheets

FIG. 4

PHOSPHORUS-CONTAINING POLYMER COMPOUND, SYNTHESIZING METHOD THEREOF, ANTIOXIDANT, HIGH-DURABILITY POLYMER ELECTROLYTE COMPOSITE, ELECTRODE, AND FUEL CELL

INCORPORATION BY REFERENCE

The disclosure of Japanese Patent Application No.2002-346180 filed on Nov., 28, 2002, including the specification, drawings and abstract is incorporated herein by reference in its entirety.

BACKGROUND OF THE INVENTION

1. Field of the Invention

The invention relates to a novel phosphorus-containing polymer compound, a method for synthesizing the phosphorus-containing polymer compound, an antioxidant including the phosphorus-containing polymer compound, a high-durability polymer electrolyte composite including the phosphorus-containing polymer compound and a fluoropolymer electrolyte, an electrode and a high-durability fuel cell.

2. Description of the Related Art

Various types of antioxidants to be added to various sorts of organic materials have been developed. For example, a phenol compound, an amine compound, a sulfur compound, and a compound containing phosphorus are known. Also, not only low molecular weight antioxidants but also high molecular weight antioxidants have been developed. However, in order to apply an antioxidant to a polymer electrolyte or the like for a fuel cell, it is desired that a polymer antioxidant be developed whose outflow to the outside of a system of the fuel cell is small even in a humid condition, which has higher heat resistance, and which can maintain performance of the fuel cell for a long time.

A polymer electrolyte is a solid polymer material having an electrolytic functional group such as a sulfonic acid group in a polymer chain thereof. The polymer electrolyte is strongly bonded to a certain ion, and is selectively pervious to a positive ion or a negative ion. Therefore, the polymer electrolyte is formed as particles, fiber or membranes, and is applied to various uses such as electrodialysis, diffusion dialysis and battery diaphragms.

For example, a reformed gas fuel cell has a proton conductive polymer electrolyte membrane with one electrode provided on each surface thereof. In the reformed gas fuel cell, hydrogen gas, which is obtained by forming a low molecular weight hydrocarbon such as methane and methanol, is supplied to one of the electrodes (fuel electrode) as fuel gas, while oxidizing gas or air is supplied to the other electrode (air electrode) as an oxidant, such that an electromotive force is generated. Water electrolysis is a method for generating hydrogen and oxygen by electrolyzing water using a polymer electrolyte membrane.

In the case of a fuel cell or water electrolysis, a peroxide is generated in a catalyst layer formed on an interface between the polymer electrolyte membrane and the electrode, and the generated peroxide becomes a peroxide radical while being diffused, and causes a reaction which deteriorates the polymer electrolyte membrane. Therefore, it is difficult to use a hydrocarbon polymer electrolyte membrane having low oxidation resistance. Accordingly, in the fuel cell and water electrolysis, a perfluoro sulfonic acid membrane having high proton conductivity, and high oxidation resistance is generally used.

Salt electrolysis is a method for generating sodium hydroxide, chlorine, and hydrogen by electrolyzing a sodium chloride solution using a polymer electrolyte membrane. In this case, the polymer electrolyte membrane is exposed to chloride, and a high-temperature solution containing a high concentration of sodium hydroxide. Therefore, it is impossible to use a hydrocarbon polymer electrolyte membrane having low resistance to chloride, and the high-temperature and concentrated sodium hydroxide solution. Accordingly, a polymer electrolyte membrane for salt electrolysis, e.g., a perfluoro sulfonic acid membrane, is generally used which is resistant to chloride and a high-temperature and concentrated sodium hydroxide solution. A carboxylic acid group may be partially introduced to a surface of the perfluoro sulfonic acid membrane in order to prevent back-diffusion of generated ions.

A fluoropolymer electrolyte membrane typified by the perfluoro sulfonic acid membrane has C—F bonding and therefore has a considerably high chemical stability. Accordingly, the fluoropolymer electrolyte is used not only as a polymer electrolyte membrane for a fuel cell, water electrolysis or salt electrolysis, but also as a polymer electrolyte membrane for hydrohalic acid electrolysis. Also, the fluoropolymer electrolyte is widely applied to a humid sensor, a gas sensor, an oxygen concentrator, and the like, due to proton conductivity thereof.

Particularly, a membrane formed of the fluoropolymer electrolyte typified by the perfluoro sulfonic acid membrane which is known under a trade name of Nafion (manufactured by Du Pont Co., Ltd.), is used as an electrolyte membrane to be used under a severe condition, due to considerably high chemical stability thereof.

However, the fluoropolymer electrolyte has shortcomings that it is difficult to produce, and is extremely costly. Therefore, it has been considered that oxidation resistance be enhanced by quenching a hydrogen peroxide radical generated in a system of the hydrocarbon polymer electrolyte membrane.

Compared with the fluoropolymer electrolyte typified by Nafion®, the hydrocarbon polymer electrolyte membrane has advantages that it is easy to produce and is low in cost. However, there remains a problem concerning the hydrocarbon polymer electrolyte membrane that oxidation resistance thereof is low, as mentioned above. The low oxidation resistance is due to the facts that a hydrocarbon compound generally has low resistance to a radical, and that an electrolyte having a hydrocarbon skeleton is likely to cause deterioration reaction due to the radical (an oxidation reaction due to a peroxide radical).

Therefore, as a high-durability polymer electrolyte, and a high-durability polymer electrolyte composite, which have oxidation resistance that is equal to or higher than that of a fluoropolymer electrolyte or that is sufficient for actual use, and which can be produced at a low cost, Japanese Patent Laid-Open Publication No. 2000-11755 discloses a high-durability polymer electrolyte which is formed of a polymer compound having a hydrocarbon portion and to which a functional group containing phosphorus is introduced, and Japanese Patent Laid-Open Publication No. 2000-11756 discloses a high-durability polymer electrolyte composite which is obtained by mixing a polymer compound having an electrolytic functional group and a hydrocarbon portion with a compound containing phosphorus.

However, in the case where the hydrocarbon polymer electrolyte membrane is used in the fuel cell, since the antioxidant electrolytes disclosed in Japanese Patent Laid-Open Publication No. 2000-11755 and Japanese Patent

Laid-Open Publication No. 2000-11756 have high gas impermeability, each of the antioxidant electrolytes greatly hinders fuel gas (hydrogen or the like) or oxidizing gas (oxygen, air, or the like) from contacting a catalyst (platinum or the like), and considerably deteriorates performance of the fuel cell, when being provided in the electrode. As described so far, there exists a problem in the combination of the hydrocarbon polymer electrolyte, and the functional group containing phosphorus or the compound containing phosphorus.

SUMMARY OF THE INVENTION

It is an object of the invention to create a novel polymer antioxidant which enhances durability of a polymer electrolyte used for a fuel cell or the like.

As a result of a dedicated research, the inventors of the present invention have achieved the invention by synthesizing a novel phosphorus-containing polymer compound which is appropriate for an antioxidant that improves oxidation resistance stability of a fluoropolymer electrolyte which originally has relatively high chemical stability.

A first aspect of the invention relates to P-PPBP (phosphonated poly(4-phenoxybenzoyl-1,4-phenylene)) having a following repeating unit.

(It is to be noted in the above formula that "n" represents a number of 5 to 10000.)

By having the main chain be a wholly aromatic chain, the above-mentioned phosphorus-containing polymer compound can have high-insolubility and heat resistance compared with a polyvinyl phosphonic acid whose main chain is an aliphatic chain. More particularly, the polyvinyl phosphonic acid dissolves in water and a thermal decomposition temperature thereof is 180° C., whereas P-PPBP is insoluble in water, and a thermal decomposition temperature thereof is 350° C. There is remarkable differences between the polyvinyl phosphonic acid and P-PPBP not only in chemical formulas but also in physical properties.

A second aspect of the invention relates to a method for synthesizing P-PPBP. In this method, PPBP (poly(4-phenoxybenzoyl-1,4-phenylene)) is used as a starting material, a phenoxy group of PPBP is halogenated, the halogen group is phosphonic acid esterified, and the phosphonic acid ester group is deesterified.

A third aspect of the invention relates to an antioxidant including P-PPBP. As mentioned above, P-PPBP is insoluble in water, and excels in heat resistance. Accordingly, when being added to various organic materials, P-PPBP effectively functions as an antioxidant.

A fourth aspect of the invention relates to a high-durability polymer electrolyte composite including a fluoropolymer electrolyte and P-PPBP. As mentioned above, P-PPBP is added to various organic materials, and effectively functions as an antioxidant. When P-PPBP is added to a polymer electrolyte among the organic materials, durability of the polymer electrolyte can be enhanced. Particularly, when P-PPBP is added to the fluoropolymer electrolyte, durability of the fluoropolymer electrolyte can be further enhanced.

Originally, the fluoropolymer electrolyte is chemically stable, since inter-molecular bonding between a carbon atom and a fluorine atom is strong. Therefore, it has not been considered that a measure to stabilize the fluoropolymer electrolyte should be taken. However, according to findings made by the inventor and et al., even in the fluoropolymer electrolyte, when a hydrogen peroxide radical or the like is generated in a system, decomposition of a side chain occurs successively in the unit of fluorine-containing ether. Also, once decomposition starts, since an amount of heat generation is large due to high bond energy between a carbon atom and a fluorine atom, thermal decomposition proceeds rapidly.

In the fourth aspect of the invention, by adding P-PPBP to the fluoropolymer electrolyte as an antioxidant, P-PPBP quenches not only the hydrogen peroxide radical generated in the system but also the decomposition radical generated in the process of decomposing the fluoropolymer electrolyte, thereby improving oxidation resistance stability of the fluoropolymer electrolyte.

The fluoropolymer electrolyte according to the fourth aspect of the invention is a fluoropolymer compound to which an electrolytic functional group such as a sulfonic acid group, and a carboxylic acid group is introduced.

A fifth aspect of the invention relates to an electrode for a fuel cell, which includes a proton exchange material and a catalyst support conductive material. The electrode according to the fifth aspect includes the high-durability polymer electrolyte composite according to the fourth aspect of the invention, as a proton exchange material.

Thus, even when the hydrogen peroxide radical is generated under a high heat condition, the radical can be quenched, and durability of the fluoropolymer electrolyte is enhanced. Also, due to a combination of the fluoropolymer electrolyte and a wholly aromatic polymer having a phosphonic acid group as an antioxidant, the following effects can be obtained: (1) since insolubility of the antioxidant is high, an outflow to the outside of a system is small even in a humid condition; (2) since the antioxidant is wholly aromatic and heat resistance thereof is high, an amount of decomposition is small, and an effect of preventing oxidation can be maintained for a long time; (3) microphase separation between the materials (the fluoropolymer electrolyte and the phosphorus-containing wholly aromatic polymer) is promoted. Due to promotion of phase separation, a difference in density between a region having a high molecular density and a region having a low molecular density increases, and porosity increases in the region having a low molecular density. Accordingly, the proton exchange material is prevented from coating the catalyst in the electrode. Due to these effects, the performance of the fuel cell can be maintained for a long time.

A sixth aspect of the invention relates to a fuel cell having the electrode according to the fifth aspect of the invention.

In P-PPBP according to the invention, it is not necessary that all the phenoxy groups of PPBP be phosphonated.

BRIEF DESCRIPTION OF THE DRAWINGS

The forgoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
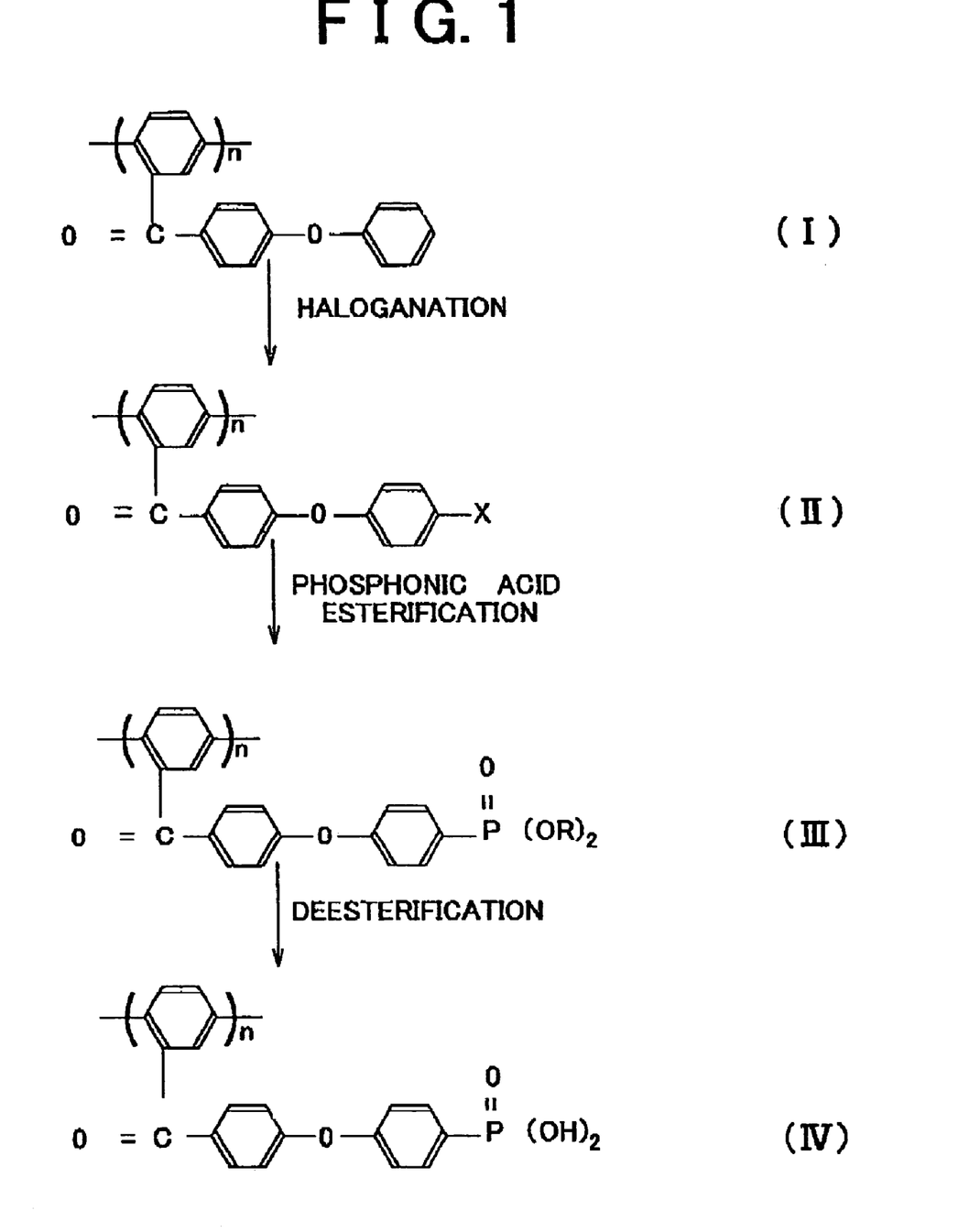
FIG. 1 shows a synthesizing scheme of P-PPBP.

FIG. 1 shows a synthesizing scheme of P-PPBP according to an embodiment of the invention. I; PPBP (4-phenoxybenzoyl-1,4-phenylene) is used as a starting material, and a phenoxy group of the I; PPBP is halogenated such that II; X-PPBP (halogenated-poly(4-phenoxybenzoyl-1,4-phenylene)) is obtained. Next, a halogen group of the I; X-PPBP is phosphonic acid esterified using phosphonic acid trialkyl such that III; EP-PPBP (phosphonic acid esterified (4-phenoxybenzoyl-1,4-phenylene)) is obtained. Finally, a phosphonic aicd ester group of the III; EP-PPBP is deesterified such that IV; P-PPBP (phosphonated poly(4-phenoxybenzoyl-1,4-phenylene)), which is a desired compound, is obtained.

Although halogen to be used is not particularly limited, it is preferable to use bromine. Although phosphonic acid trialkyl to be used is not particularly limited; it is preferable to use lower alkyl group such as methyl and ethyl as alkyl group of alkyl phosphonic acid.

An organic material to which P-PPBP is added as an antioxidant is not particularly limited. P-PPBP may be added to a natural resin, a synthetic resin, a natural rubber, a synthetic rubber, natural fibers, synthetic fibers and the like.

Concrete examples of organic materials are polyolefin resins such as polypropylene resin, polyethylene resin, polybutene resin, and polypentene resin; thermoplastic resins such as polystyrene resin, acrylonitrile-butadiene-styrene resin, polycarbonate resin, polyphenylene ether resin, acrylic resin, polyamide resin, and polyvinyl chloride resin; rubber materials such as natural rubber (NR), isoprene rubber (IR), butadiene rubber (BR), 1,2-polybutadiene rubber (1,2-BR), styrene-butadiene rubber (SBR), chloroprene rubber (CR), nitrile rubber (NBR), butyl rubber (IIR), ethylene-propylene rubber (EPR (ethylene propylene diene methylene (EPDM)), chlorosulfonated polyethylene, acrylic rubber, epichlorohydrin rubber, polysulfide rubber, silicone rubber, fluorinated rubber, and urethane rubber, and thermosetting resins such as polyurethane, polyisocyanate, polyisocyanurate, phenol resin, epoxy resin, urea resin, melamine resin, unsaturated polyester resin, and polyimide. Each of these materials may be used by itself. Also, two or more of these materials can be used in combination.

Among the organic materials to which P-PPBP is added as an antioxidant, when P-PPBP is added to the polymer electrolyte, durability of the polymer electrolyte can be drastically enhanced. Particularly, when P-PPBP is added to the fluoropolymer electrolyte, durability of the polymer electrolyte can be further enhanced. In this case, the fluoropolymer electrolyte is a fluoropolymer polymer compound to which an electrolytic functional group such as a sulfonic acid group and a carboxylic acid group is introduced. More particularly, the fluoropolymer electrolyte is a polymer formed by introducing the electrolytic functional group such as the sulfonic acid group as a substituent to a fluorocarbon skeleton or a hydrofluorocarbon skeleton. The fluoropolymer electrolyte may have an ether group, chlorine, a carboxylic acid group, a phosphoric acid group or an aromatic ring. Generally, a polymer having perfluorocarbon as a main chain skeleton, and having the sulfonic acid group through a spacer such as perfluoro ether and the aromatic ring is used. Concrete examples are polymers having structures expressed by the following formulas (1) and (2).

(It is to be noted in the above formula that "x" represents an integral number of 0 to 2, "y" represents an integral number of 2 or 3, "n/m" represents a number of 1 to 10.)

(It is to be noted in the above formula that "n/m" represents a number of 0.1 to 2.)

As the polymer expressed by the formula (1), "Nafion®" manufactured by Du Pont Co., Ltd., "Aciplex-S®" manufactured by Asahi Chemical Industry Co., Ltd. and the like are known. Japanese Patent Publication No. 8-512358 discloses that the polymer expressed by the formula (2) is used as a fuel cell. The perfluoropolymer expressed by the formula (2) excels in stability when being used as a fuel cell. Accordingly, it is preferable that the perfluoropolymer expressed by the formula (2) be used as a material to which P-PPBP according to the embodiment of the invention is added.

A mixture ratio of P-PPBP to the fluoropolymer electrolyte is adjusted according to characteristics required of the polymer electrolyte, such as conductivity and oxidatioin resistance.

Namely, as the percentage of P-PPBP content increases, oxidation resistance is enhanced. However, since P-PPBP is acidulous, as the content thereof increases, conductivity of the entire material decreases. Accordingly, when P-PPBP is used in a case where only oxidation resistance is required and high conductivity is not required, the mixture ratio of P-PPBP to the fluoropolymer electrolyte is increased.

Meanwhile, in the case where both high oxidation resistance and high conductivity are required, such as in a fuel cell and water electrolysis, P-PPBP and a fluoropolymer electrolyte to which a strong acid group such as a sulfonic acid group is introduced are mixed with each other at a predetermined mixture ratio. Meanwhile, in the case where high resistance to chlorine and a high-temperature and concentrated sodium hydroxide solution is required, and back diffusion of ions needs to be prevented, such as in salt electrolysis, P-PPBP and a fluoropolymer electrolyte to which a sulfonic acid group, a carboxylic acid group and the like are introduced are mixed with each other at a predetermined ratio.

However, when a percentage of P-PPBP content becomes lower than 0.1 mass % of the entire electrolyte composite, the effect of enhancing oxidation resistance becomes insufficient. Accordingly, the percentage of P-PPBP content needs to be equal to or higher than 0.1 mass % of the entire electrolyte composite. Particularly, in the case of a polymer electrolyte which is to be used under a severe condition, such as in a fuel cell, water electrolysis, and salt electrolysis, it is preferable that the percentage of P-PPBP content be equal to or higher than 5 mass % of the entire electrolyte composite.

As an antioxidant to be added to the fluoropolymer electrolyte composite, an antioxidant to be added to a known polymer electrolyte can be used in combination with P-PPBP. Examples of the antioxidants are a phenol compound, an amine compound, a sulfur compound, and a compound containing phosphorus.

Examples of phenol compounds are hydroquinone, p-cresol, BHT, and a hindered phenol compound. Concrete examples of the hindered phenol compounds are 2,6-di-tert-butyl-4-methylphenol; 2,2'-methylene-bis(4-methyl-6-tert-butylphenol); 2,2'-methylene-bis(4-ethyl-6-tert-butylphenol); 4,4'-thio-bis(3-methyl-6-tert-butylphenol); 4,4'-butylidene-bis(3-methyl-6-tert-butylphenol); triethyleneglycol-bis(3-(3-tert-butyl-5-methyl-4-hydroxyphenyl)propionate); 1,6-hexanediol-bis(3-(3,5-di-tert-butyl-4-hydroxyphenyl)propionate); 2,2-thio-diethylenebis(3-(3,5-di-tert-butyl-4-hydroxyphenyl)propionate; octadecyl-3-(3,5-di-tert-butyl-4-hydroxyphenyl)propionate; 3,5-di-tert-butyl-4-hydroxybenzylphosphonate-diethylester; 1,3,5-trimethyl-2,4,6-tris(3,5-di-tert-butyl)-4-hydroxybenzylbenzene; and iso-octyl-3-(3,5-di-tert-butyl-4-hydroxyphenyl)propionate.

Concrete examples of the amine compounds are phenyl-2-naphthylamine; phenothiazine; diphenylphenylenediamine; naphthylamine; octylated diphenylamine(4,4'-dioctyl-diphenylamine); 4,4'-dicumyl-diphenylamine; 6-ethoxy-2,2,4-trimethyl-1,2-dihydroquinoline; and 2,2,4-trimethyl-1,2-dihydroquinolinepolymer.

Concrete examples of the sulfur compounds are 2-mercaptobenzimidazol; and 2,4-bis ((octylthio)methyl)-o-cresol; and 2,4-bis-(n-octylthio)-6-(4-hydroxy-3,5-di-tert-butylanilino)-1,3,5-triazine.

An example of the compound containing phosphorus may be selected from a group consisting of phosphoric acid; triethyl phosphite, triethyl phosphate; triphenylphosphine; triphenylphosphine oxide; triphenylphosphine sulfide; distearylpentaethyldiphosphite; organic phosphite; diphenylisodecylphosphite; diphenyliso-octylphosphite; diisodecylphenylphosphite; triphenylphosphite; and trisnonylphenylphosphite. It is preferable that an example of the compound containing phosphorus be selected from a group consisting of conjugated organic phosphite; polyphosphite; and tetrapentaerythritol.

Among the compound containing phosphorus, it is particularly preferable to use alkyl sulfone. Concrete examples are a polyvinyl phosphonic acid, a xylidyl phosphonic acid, and a benzyl phosphonic acid.

It is possible to use one type, or two or more types of the antioxidants in combination with P-PPBP. The percentage of all the antioxidants content is normally 0.005 to 50 mass % of the polymer electrolyte composite, and is preferably 0.01 to 10 mass % of the polymer electrolyte composite.

Also, it is possible to use another compound containing phosphor in combination with P-PPBP. In this case, the compound containing phosphorus is a substance having a functional group containing phosphorus. The compounds containing phosphorus correspond to a compound having a functional group containing phosphorus, e.g., a polymer compound having a functional group containing phosphorus in a main chain or a side chain.

Concrete examples of the functional group containing phosphorus are a phosphoric acid group, a phosphonic acid ester group, a phosphite group, a phosphoric acid group, and a phosphoric acid ester group. Among these functional groups, the phosphonic acid group is particularly appropriate as the functional group containing phosphorus, since the phosphonic acid group is inexpensive, and can provide high oxidation resistance to organic materials.

Concrete examples of the phosphorus-containing polymers are polyvinyl phosphonic acid or a polyether sulfonic resin to which the phosphonic acid group or the like is introduced; a polyether ether ketone resin; a straight chain type phenol formaldehyde resin; a crosslinked phenol formaldehyde resin; a straight chain type polystyrene resin; a crosslinked polystyrene resin; a straight chain type poly (trifluorostyrene) resin; a crosslinked (trifluorostyrene) resin; a poly(2,3-diphenyl-1,4-phenylene oxide) resin; a poly(allylether ketone) resin; a poly(arylene ether sulfone) resin; a poly(phenylquinoxaline) resin; a poly(benzylsilane) resin; a polystyrene-graft-ethylenetetrafluoroethylene resin; a polystyrene-graft-polyvinylidene fluoride resin; and a polystyrene-graft-tetrafluoroethylene resin. Further examples of phosphorus-containing polymer are a polyimidazole containing phosphonic acid; a polyacrylo phosphonic acid; and phosphonic acid oligomer containing fluoroalkyl.

The method for mixing the fluoropolymer electrolyte and P-PPBP is not particularly limited, and various methods can be employed. For example, doping or blending using a solution may be employed. When both the fluoropolymer electrolyte and the antioxidant dissolve by heat, blending by heat dissolution may be employed.

Also, a configuration may be employed in which the antioxidant is dispersed evenly in the polymer electrolyte by mixing the fluoropolymer electrolyte and P-PPBP evenly. Alternatively, a main portion of the polymer electrolyte may be formed only of the fluoropolymer electrolyte, and only a portion which requires oxidation resistance may be formed of the mixture of the fluoropolymer electrolyte and the antioxidant.

In a condition where a radical is generated randomly in the membrane, for example, when the polymer electrolyte membrane is heated while being immersed in a peroxide solution, a configuration, in which the fluoropolymer electrolyte and P-PPBP are mixed evenly and P-PPBP is dispersed in the polymer electrolyte membrane evenly, is effective.

Meanwhile, in an environment where a peroxide is generated in a catalyst layer on a surface of an electrolyte membrane such as an electrolyte membrane for water electrolysis or a fuel cell, the generated peroxide becomes a peroxide radical while being diffused, and causes a deterioration reaction, it is not necessary that P-PPBP be dispersed evenly in the electrolyte membrane. In this case, only a surface portion of the electrolyte membrane where oxidation degradation reaction is the most vigorous is formed of the mixture of the fluoropolymer electrolyte and P-PPBP.

A method, whereby a membranous product formed of the mixture of the fluoropolymer electrolyte and P-PPBP is interposed between the electrolyte membrane formed only of the fluoropolymer electrolyte and the electrode, is effective for maintaining the performance of the electrolyte membrane.

The high-durability polymer electrolyte composite formed of the fluoropolymer electrolyte and P-PPBP can be preferably used for a fuel cell (an electrolyte membrane, an electrode), water electrolysis, hydrohalic acid electrolysis, salt electrolysis, an oxygen concentrator, a moisture sensor, a gas sensor and the like.

For example, an electrode of a polymer electrolyte fuel cell is formed of a proton exchange material containing a high-durability polymer electrolyte composite and a catalyst support conductive material. In the electrode, (1) since nonsolubility of P-PPBP, which is an antioxidant, is high, an outflow of P-PPBP to the outside of the system of the fuel cell is small even when being used in a humid condition, (2) since P-PPBP is wholly aromatic and heat resistance thereof is high (heat resistance can be maintained for a long time), a decomposition amount is small and the effect of preventing oxidation can be maintained for a long time. In addition, (3) microphase separation between the materials (the fluoropolymer electrolyte and P-PPBP) is promoted. Due to promotion of phase separation, a difference in density between a region having a high molecular density and a region having a low molecular density increases, and porosity increases in the region having a low molecular density. Accordingly, the proton exchange material is prevented from coating the catalyst in the electrode. Namely, the gas diffusion characteristic is excellent.

Then, the fuel cell is manufactured by bringing the electrode catalyst layer formed by laminating catalyst support bodies into close contact with the polymer electrolyte membrane selectively pervious to a proton (hydrogen ion), and sandwiching the polymer electrolyte membrane between a pair of the electrodes with an electrolyte catalyst layer interposed between each of the electrodes and the polymer electrolyte membrane. Due to the reasons (1) to (3), the performance of the fuel cell can be maintained for a long time.

The embodiment of the invention will be described in more detail according to the following examples.

Synthesizing P-PPBP

Figure 2:
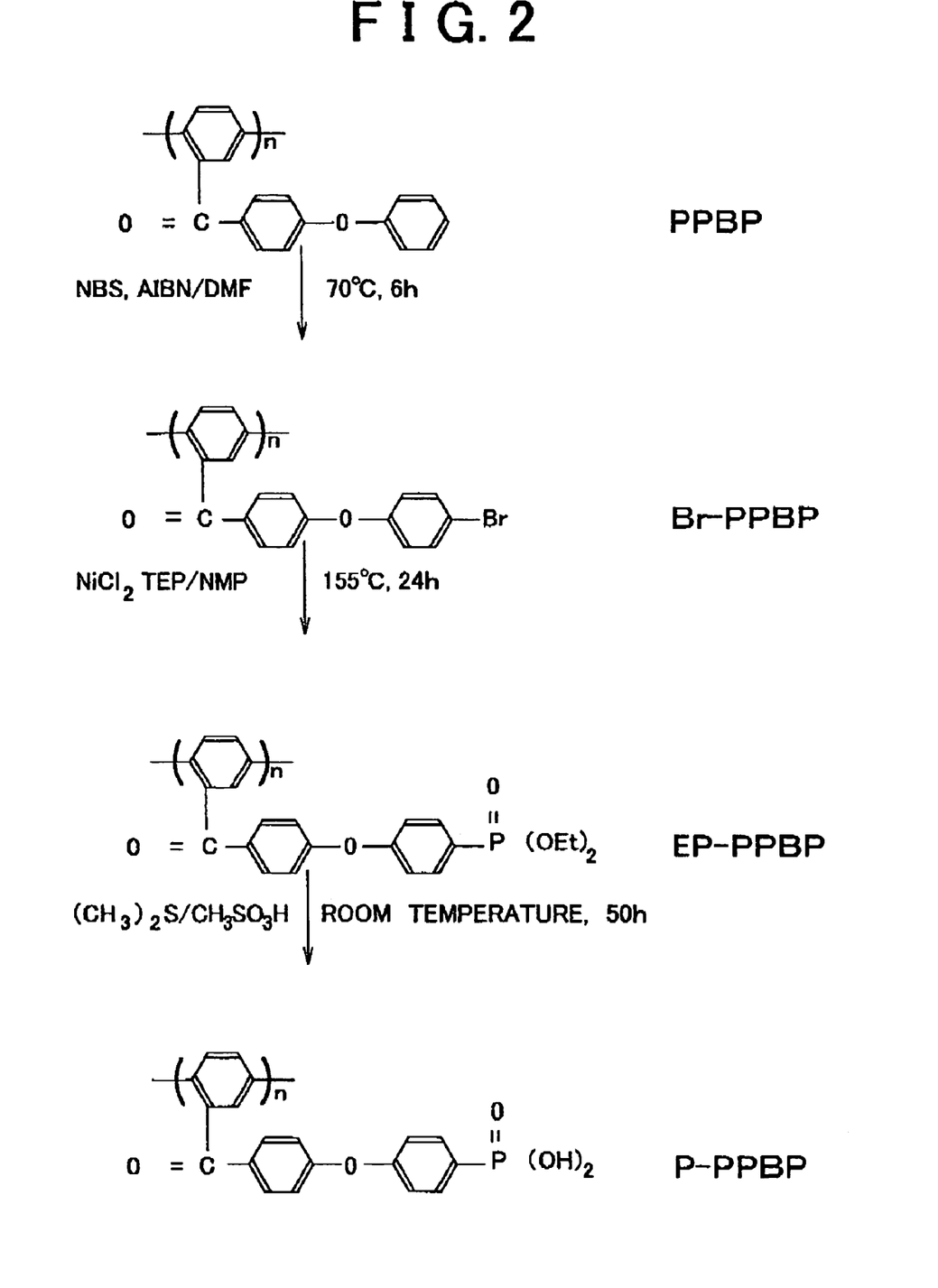
FIG. 2 shows a synthesizing scheme of P-PPBP according to an embodiment.

As shown in FIG. 2, initially, the end of the side chain of PPBP was brominated such that Br-PPBP was obtained. Next, bromine was substituted by a phosphonate ester group such that EP-PPBP was obtained. Finally, EP-PPBP was deesterified such that P-PPBP was obtained.

Figure 3:
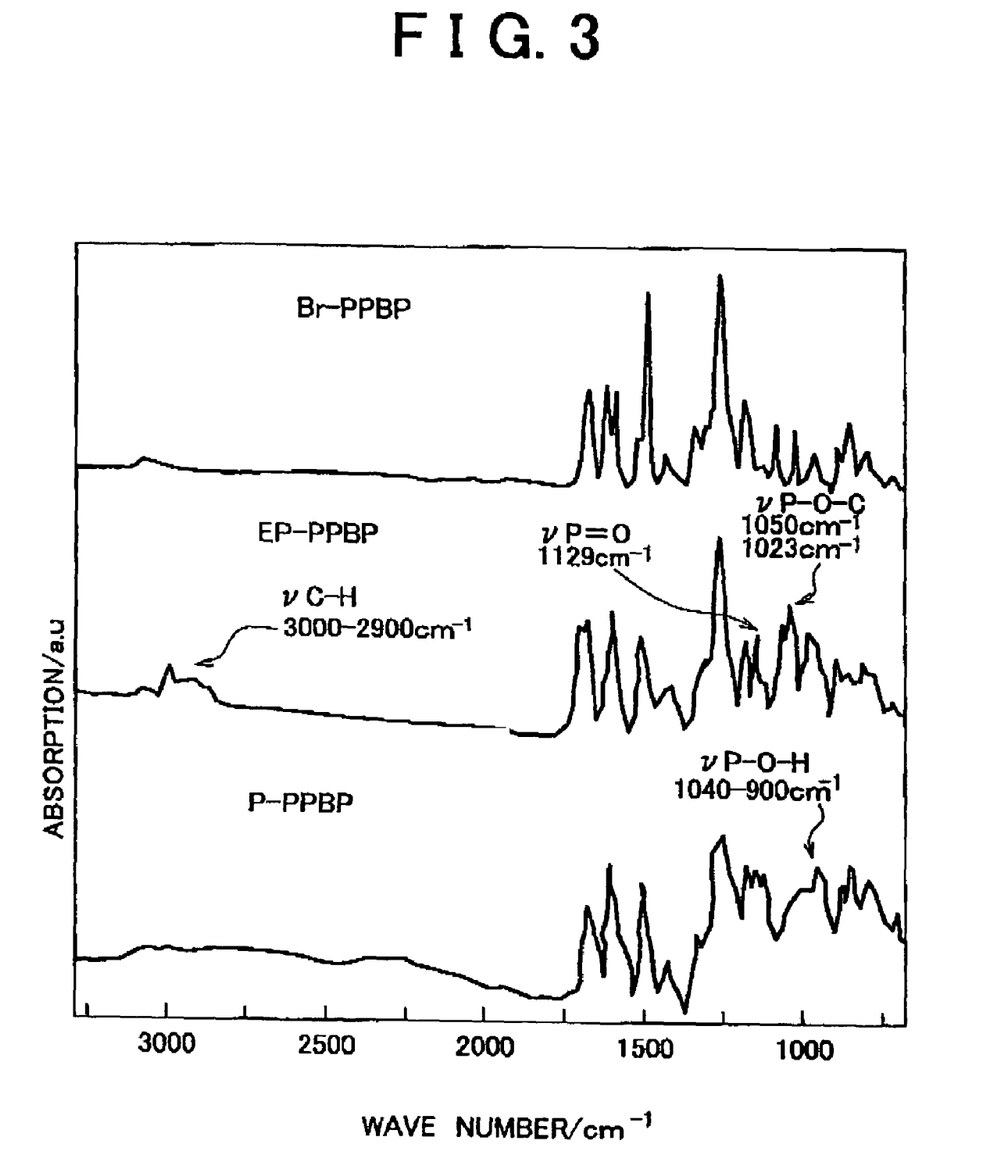
FIG. 3 shows FT-IR spectras of Br-PPBP (brominated-poly(4-phenoxybenzoyl-1,4-phenylene)), EP-PPBP (phosphonic acid esterified poly(4-phenoxybenzoyl-1,4-phenylene)), and P-PPBP.

Identification of each compound was performed by elemental analysis, ICP, FT-IR, and $^1$H-NMR. As characteristic evaluations of P-PPBP, a fenton test, a thermal analysis, and conductivity measurement were performed. As shown in FIG. 3, a peak due to C—Br stretching vibration was observed in an FT-IR spectra of Br-PPBP, a peak due to P—O—C stretching vibration was observed in an FT-IR spectra of EP-PPBP, and a peak due to P—O—H stretching vibration was observed in an FT-IR spectra of P-PPBP. According to the results, it was confirmed that the phosphonic acid group was introduced in a para position on a benzene ring of the end of the side chain of PPBP. By elemental analysis, a bromination rate was calculated to be approximately 100%, a phosphonic acid esterification rate was calculated to be approximately 64%, and a phosphonic acidification rate was calculated to be approximately 50%. Also, it was found that a thermal decomposition temperature of P-PPBP was 350° C., and P-PPBP showed proton conductivity of approximately $10^{-4} Scm^{-1}$ at 90% R.H., and a 80° C.

Manufacturing Electrode for Fuel Cell to Which P-PPBP is Added 3.3 ml of electrolyte solution (a commercial solution containing 5% of Nafion®), 160 mg of P-PPBP and a predetermined amount of water were added to 1100 mg of 60% platinum support carbon, and they were agitated. A homogeneous dispersive solution was thus made. The dispersive solution was provided on a fluorocarbon resin sheet using a doctor blade, and was dried under a reduced pressure at a temperature of 80° C. for 8 hours. An electrode sheet for a fuel cell is thus obtained. It is to be noted herein that Pt: C: Nafion: P-PPBP=60:40:28:14.

Decomposition Behavior Analysis by TG-MS

Figure 4:
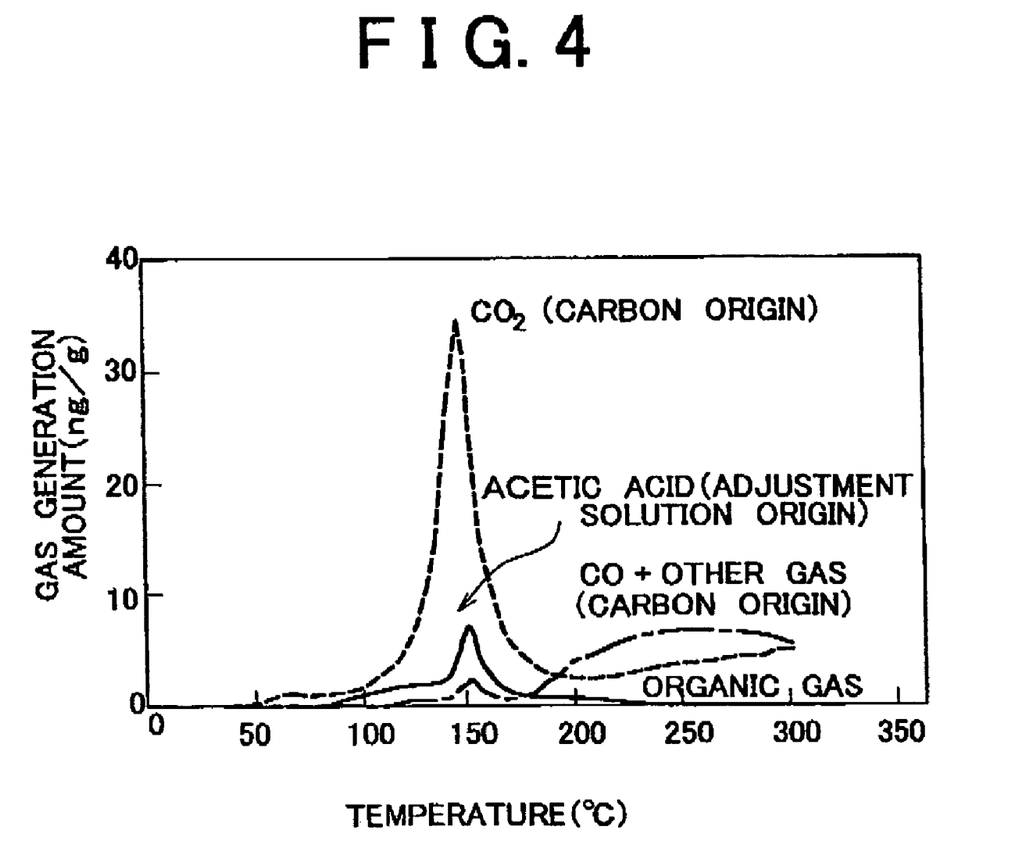
FIG. 4 is a graph showing gas leak amounts of materials to which P-PPBP is added, obtained by an acceleration durability test.

An amount of gas generated at each temperature was measured by TG-MS, and an effect on thermal decomposition due to addition P-PPBP was examined. In an He atmosphere, the temperature increased at a rate of 10° C./min. FIG. 4 shows behaviors of generation of $CO_2$ and the like, which are the decomposition components of P-PPBP. Only generation of an acetic acid of an adjustment solution origin, and $CO_2$ and CO of carbon origin were observed near a temperature of 150° C. Generation of gas of P-PPBP origin was not observed. Decomposition of P-PPBP started from a temperature of 350° C. This shows that P-PPBP has sufficient heat resistance so as to be able to endure the operating temperature of the fuel cell.

According to the above-mentioned results, it was confirmed that the decomposition stability of Nafion® in the electrode for heat was drastically improved due to addition of P-PPBP. The decomposition suppressing mechanism is not exactly clear. However, it can be estimated that successive occurrence of decomposition is stopped by stabilizing the carbon radical after the sulfonic acid group is removed from the polymer electrolyte.

Evaluation of Stability With Time by Cell Evaluation

Initial Characteristics

An I-V evaluation was performed under conditions of; cell: 80° C., A (anode) bubbler: $H_2$, 275 cc/min, C (cathode) bubbler: Air, 912 cc/min, and both electrodes: 2ata. Although P-PPBP was added to the electrode, an inclination of the example was substantially the same as that an electrode to which P-PPBP was not added. The example and the comparative example have substantially the same contact resistance between the membrane and the electrode. Also, the example and the comparative example have substantially the same limiting current values, and drainage characteristics of the electrodes. The fact, that the limiting current values are substantially the same although the amount of the electrolyte is increased to 1.5 times in weight, and is increased to approximately two times in volume due to addition of P-PPBP, shows that drainage characteristics are not deteriorated due to addition of P-PPBP. According to the results, it was confirmed that the fuel cell characteristics, particularly resistance and the limiting current value do not change due to addition of P-PPBP.

Gas Leak Amount Measured by Acceleration Durability Test

Continuous operation was performed under conditions of cell: 80° C., A: humidified $H_2$ gas, C: humidified air, and under load conditions including a condition of open circuit. When P-PPBP was not added; the gas leak amount was increased from the beginning. When P-PPBP was added, the gas leak amount was maintained at a low level even when 250 hours have passed. Originally, the effect of preventing oxidation due to addition of P-PPBP is expected on the electrolyte in the electrode. However, according to the results, it was confirmed that deterioration of the electrolyte membrane was also suppressed. The cause for the phenomenon is not exactly clear. However, it can be considered that the hydrogen peroxide radical or the decomposition radical generated in the electrode was inactivated by the antioxidant, and the disperse of the radical into the electrolyte membrane was suppressed.

What is claimed is:

1. A high-durability polymer electrolyte composite including a fluoropolymer electrolyte and a phosphonated poly(4-phenoxybenzoyl-1,4-phenylene) having a following repeating unit:

wherein "n" represents a number from 5 to 10000.

2. The polymer electrolyte composite according to claim 1, wherein a percentage of the phosphonated poly(4-phenoxybenzoyl-1,4-phenylene) content is equal to or higher than 0.1 mass % of the entire polymer electrolyte composite.

3. The polymer electrolyte composite according to claim 2, wherein a percentage of the phosphonated poly(4-phenoxybenzoyl-1,4-phenylene) content is equal to or higher than 5 mass % of the entire polymer electrolyte composite.

4. The polymer electrolyte composite according to claim 1, wherein an antioxidant other than the phosphonated poly(4-phenoxybenzoyl-1,4-phenylene) is added to the polymer electrolyte composite, and a percentage of all antioxidants is 0.005 to 50 mass % of the polymer electrolyte composite.

5. The polymer electrolyte composite according to claim 4, wherein a percentage of the all antioxidants is 0.01 to 10 mass % of the polymer electrolyte composite.

6. An electrode for a fuel cell, comprising:
    the polymer electrolyte composite according to claim 1; and
    a catalyst support conduction material.

7. A fuel cell comprising the electrode according to claim 6.

* * * * *